(12) United States Patent
Gray et al.

(10) Patent No.: US 6,916,895 B2
(45) Date of Patent: Jul. 12, 2005

(54) ZIEGLER-NATTA CATALYST FOR TUNING MWD OF POLYOLEFIN, METHOD OF MAKING, METHOD OF USING, AND POLYOLEFINS MADE THEREWITH

(75) Inventors: Steven D. Gray, Houston, TX (US); Tim J. Coffy, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/687,126

(22) Filed: Oct. 16, 2003

(65) Prior Publication Data

US 2004/0082740 A1 Apr. 29, 2004

Related U.S. Application Data

(60) Division of application No. 09/687,378, filed on Oct. 13, 2000, now Pat. No. 6,734,134, which is a continuation-in-part of application No. 08/789,862, filed on Jan. 28, 1997, now Pat. No. 6,174,971.

(51) Int. Cl.[7] ............................................. C08F 110/02
(52) U.S. Cl. ................ 526/352; 526/124.1; 526/123.1; 526/124.2; 526/124.3; 526/158; 502/103; 502/115; 502/116; 502/134; 502/132
(58) Field of Search ........................... 526/124.1, 124.2, 526/124.3, 158, 352, 123.1; 502/103, 115, 116, 134, 132

(56) References Cited

U.S. PATENT DOCUMENTS

| | | |
|---|---|---|
| 4,255,544 A | 3/1981 | Kimura et al. |
| 4,426,316 A | 1/1984 | Gessell |
| 4,448,944 A | 5/1984 | Berthold et al. |
| 4,526,943 A | 7/1985 | Fuentes, Jr. et al. |
| 4,634,749 A | 1/1987 | Best |
| 4,719,193 A | 1/1988 | Levine et al. ............... 502/107 |
| 4,914,069 A | 4/1990 | Job et al. |
| 5,037,789 A * | 8/1991 | Buehler ..................... 502/119 |
| 5,155,187 A | 10/1992 | Shelley |
| 5,610,246 A | 3/1997 | Buehler et al. |
| 5,631,334 A | 5/1997 | Zandona |
| 5,817,591 A * | 10/1998 | Shamshoum et al. ....... 502/127 |
| 6,174,971 B1 | 1/2001 | Chen et al. |
| 6,486,274 B1 | 11/2002 | Gray et al. |

FOREIGN PATENT DOCUMENTS

| | | |
|---|---|---|
| DE | 3432759 | 3/1986 |
| EP | 0068256 | 6/1982 |
| EP | 0357135 | 3/1990 |
| EP | 0855409 | 7/1998 |
| WO | 8404925 | 12/1984 |

* cited by examiner

*Primary Examiner*—Ling-Sui Choi
(74) *Attorney, Agent, or Firm*—Madan, Mossman & Sriram, P.C.; Tenley R. Krueger

(57) ABSTRACT

A new synthesis of a Ziegler-Natta catalyst uses a multi-step preparation that includes treating a magnesium dialkoxide compound with halogenating/titanating agents, an organoaluminum preactivating agent, and a heat treatment. The catalyst may be used in the polymerization of olefins, particularly ethylene, to control the molecular weight distribution of the resulting polyolefins.

30 Claims, 1 Drawing Sheet

Effect of Heat Treatment on Catalyst Intrinsic MWD

ZIEGLER-NATTA CATALYST FOR TUNING MWD OF POLYOLEFIN, METHOD OF MAKING, METHOD OF USING, AND POLYOLEFINS MADE THEREWITH

REFERENCE TO RELATED APPLICATION

The present application is a Divisional Application of U.S. patent application Ser. No. 09/687,378, entitled, "Ziegler-Natta catalyst for tuning MWD of polyolefin, Method of Making, Method of Using and Polyolefins Made Therewith," filed Oct. 13, 2000 (incorporated herein by reference) now U.S. Pat. No. 6,734,134, which is a Continuation in Part of application Ser. No. 08/789,862, filed Jan. 28, 1997, which issued as U.S. Pat. No. 6,174,971.

BACKGROUND OF THE INVENTION

1. Field of the Invention

The present invention relates to catalysts, to methods of making catalysts, to methods of using catalysts, to methods of polymerizing, and to polymers made with such catalysts. In another aspect, the present invention relates to polyolefin catalysts, to methods of making such catalysts, to methods of using such catalysts, to polyolefin polymerization, and to polyolefins. In even another aspect, the present invention relates to Ziegler-Natta catalysts, to methods of making such catalysts, to methods of using such catalysts, to polyolefin polymerization, and to polyolefins.

2. Description of the Related Art

Having been around since the early 1950's, Ziegler-type polyolefin catalysts, their general methods of making, and subsequent use, are well known in the polymerization art.

However, while much is known about Ziegler-type catalysts, there is a constant search for improvements in their polymer yield, catalyst life, catalyst activity, and in their ability to produce polyolefins having certain properties.

U.S. Pat. No. 4,255,544, issued Mar. 10, 1981 to Kimura et al., discloses a process for polymerization of ethylene utilizing a catalyst comprising (A) the reaction product of a magnesium compound and titanium halide, and (B) an organic aluminum compound, wherein component A is prepared by reacting magnesium dialkoxide with a hologen-containing silicon compound and an alcohol to provide a solid material and then reacting the solid material with titanium halide in the presence of an alkoxy-containing silicon compound.

U.S. Pat. No. 4,914,069, issued Apr. 3, 1990 to Job et al., discloses the preparation of an olefin polymerization catalyst component having improved activity and selectivity, which are prepared by (a) halogenating a magnesium compound containing at least one aryloxy, alkyl or carbonate or alkloxy group with a first halide of tetravalent titanium and a first electron donor; (b) contacting the resulting product with a second halide of tetravalent titanium; and (c) washing a resulting treated halogenated product with an inert hydrocarbon liquid. In the process, a second electron donor is used in step (a) or (b), and that the product of step (b) is contacted in a step (b2) with a third halide of tetravalent titanium at a temperature of 40° C. to 140° C. and thereafter the treated product is washed in step (c).

U.S. Pat. No. 5,155,187, issued Oct. 13, 1992 to Shelly, discloses a polymerization method utilizing a catalyst which is the reaction product generally of a silicon-containing compound, a magnesiumdialkyl, an alcohol, a halide-containing metal compound, an aluminum alkoxide, and a second halide-containing metal compound.

U.S. Pat. No. 5,610,246, issued Mar. 11, 1997 to Buehler et al., discloses a process for polymerizing propylene using a silica-supported catalyst. The catalyst comprises the product obtained by contacting silica, in random order, with (1) at least one hydrocarbon soluble magnesium-containing compound; and (2) a first modifying compound selected from the group consisting of silicon halides, boron halides, aluminum halides and mixtures thereof followed by a second specified modifying compound.

U.S. Pat. No. 5,631,334, issued May 20, 1997 to Zandona, disclose a process for the manufacture of a catalytic solid for the (co)polymerization of at least one olefin, comprising the coprecipitate magnesium and of at least one transition metal.

However, in spite of these advancements in the prior art, none of these prior art references disclose or suggest a heat treatment of a preactivated polyolefin catalyst.

Furthermore, none of these prior art references disclose or suggest that heat treatment of a preactivated polyolefin catalyst will provide any effect on the polymer molecular weight distribution ("MWD").

Thus, there is a need in the art for a polyolefin catalyst.

There is another need in the art for a method of making a polyolefin catalyst.

There is even another need in the art for a method of polymerizing olefins.

There is still another need in the art for polyolefins of various MWD.

There is yet another need in the art for a polyolefin catalyst allowing for production of polyolefins of various MWD, with a catalyst that also has high activity and excellent fluff morphology.

There is even yet another need in the art for a method of using a heat treated preactivated polyolefin catalyst to effect polyolefin MWD.

These and other needs in the art will become apparent to those of skill in the art upon review of this specification, including its drawings and claims.

SUMMARY OF THE INVENTION

It is an object of the present invention to provide for a polyolefin catalyst.

It is another object of the present invention to provide for a method of making a polyolefin catalyst.

It is even another object of the present invention to provide for a method of polymerizing olefins. It is still another object of the present invention to provide for polyolefins of various MWD.

It is yet another object of the present invention to provide for a polyolefin catalyst allowing for production of polyolefins of various MWD, with a catalyst that also has high activity and excellent fluff morphology.

It is even yet another object of the present invention to provide for a method of using a heat treated preactivated polyolefin catalyst to effect polyolefin MWD.

According to one embodiment of the present invention there is provided a polyolefin catalyst. The catalyst is produced by a method comprising the steps of: a) synthesizing a soluble magnesium dialkoxide of the general formula $Mg(OR'')_2$ as a product of a reaction comprising a magnesium dialkyl of the general formula $MgRR'$ and an alcohol of the general formula $R''OH$, where R, R' and R'' are each a hydrocarbyl or substituted hydrocarbyl having from 1 to 20 carbon atoms, and wherein any two or more of R, R' and R'' may be the same or different; b) contacting the magnesium dialkoxide compound with a mild halogenating agent capable of exchanging one halogen for one alkoxide to form a reaction product "A"; c) contacting reaction product "A" with a first halogenating/titanating agent to form reaction product "B"; d) contacting reaction product "B" with a second stronger halogenating/titanating agent to form reaction product "C"; e) contacting reaction product "C" with an organoaluminum preactivating agent to form a preactivated catalyst; and f) heating the preactivated catalyst. The preactivated catalyst is heated in step f) at a temperature in the range of about 90° C. to about 150° C., for a time in the range of about thirty minutes to about a twenty-four hours.

Another embodiment of the invention provides polyolefin polymer. The polymer is produced by a process comprising contacting one or more α-olefin monomers together under polymerization conditions in the presence of a catalyst of the invention. Generally the monomers are ethylene monomers, and the polymer is a polyethylene polymer.

Even another embodiment of the invention provides a catalyst system comprising a polyolefin catalyst of the invention, and an inert support. Generally the inert support is a magnesium compound.

Still another embodiment of the invention provides a process for making a catalyst. Generally, the process comprises the steps of: a) synthesizing a soluble magnesium dialkoxide of the general formula $Mg(OR")_2$ as a product of a reaction comprising a magnesium dialkyl of the general formula MgRR' and an alcohol of the general formula R"OH, where R, R' and R" are each a hydrocarbyl or substituted hydrocarbyl having from 1 to 20 carbon atoms, and wherein any two or more of R, R' and R" may be the same or different; b) contacting the magnesium dialkoxide compound with a mild halogenating agent capable of exchanging one halogen for one alkoxide to form a reaction product "A"; c) contacting reaction product "A" with a first halogenating/titanating agent to form reaction product "B"; d) contacting reaction product "B" with a second stronger halogenating/titanating agent to form reaction product "C"; e) contacting reaction product "C" with an organoaluminum preactivating agent to form a preactivated catalyst; and f) heating the preactivated catalyst. The preactivated catalyst is heated in step f) at a temperature in the range of about 90° C. to about 150° C., for a time in the range of about thirty minutes to about a twenty-four hours.

Yet another embodiment of the invention provides a process for α-olefin polymerization. Generally the process comprises the steps of: a) contacting one or more α-olefin monomers together in the presence of a catalyst under polymerization conditions; and b) extracting polyolefin polymer. Preferably, the monomers are ethylene monomers and the polymer is polyethylene. The catalyst utilized in this process is produced by the steps of (i) synthesizing a magnesium dialkoxide of the general formula $Mg(OR")_2$ from a magnesium dialkyl of the general formula MgRR' and an alcohol of the general formula R"OH, where R, R" and R" are each a hydrocarbyl or substituted hydrocarbyl having from 1 to 20 carbon atoms, and wherein any two or more of R, R' and R" may be the same or different; (ii) contacting the magnesium dialkoxide compound with a mild halogenating agent capable of exchanging one halogen for one alkoxide to form a reaction product "A"; (iii) contacting reaction product "A" with a first halogenating/titanating agent to form reaction product "B"; (iv) contacting reaction product "B" with a second stronger halogenating/titanating agent to form reaction product "C"; (v) contacting reaction product "C" with an organoaluminum preactivating agent to form a preactivated catalyst; and (vi) heating the preactivated catalyst.

These and other objects of the present invention will become apparent to those of skill in the art upon review of this specification, including its drawings and claims.

DETAILED DESCRIPTION OF THE INVENTION

Figure 1:
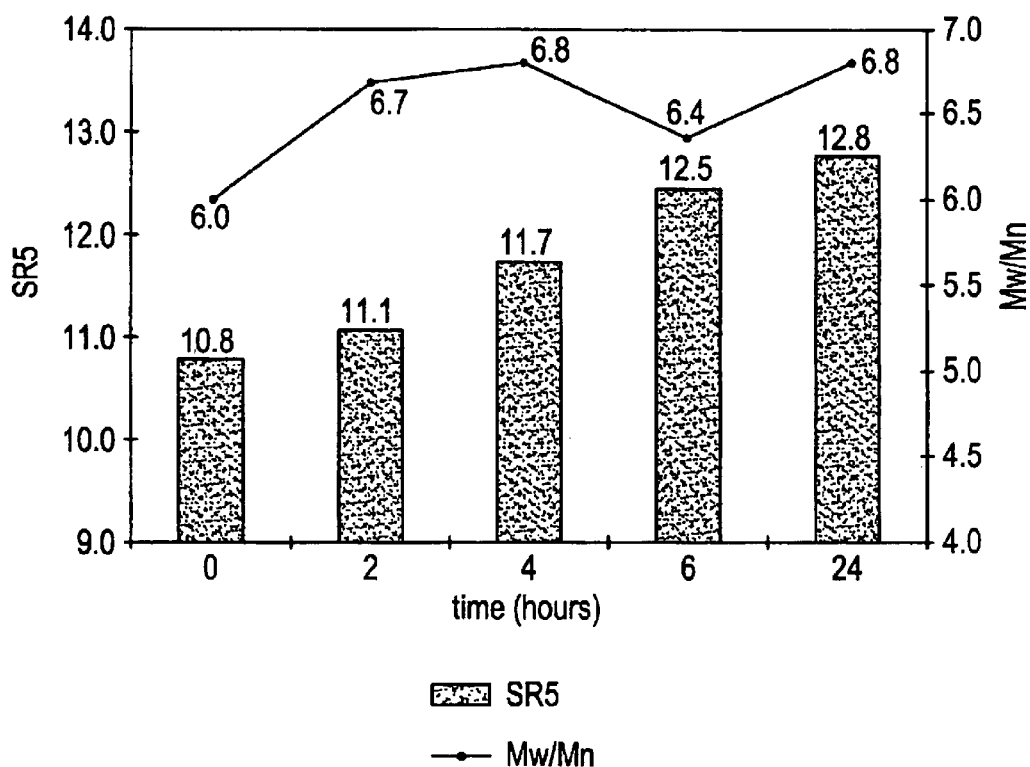
FIG. 1 is a bar graph showing the effect of heat treatment on catalyst intrinsic MWD.

The method of the present invention for making a catalyst component generally includes the steps of forming a metal dialkoxide from a metal dialkyl and an alcohol, halogenating the metal dialkoxide, halogenating/titanating in one or more steps to form a catalyst component, treating the catalyst component with a preactivation agent such as an organoaluminum to form a preactivated catalyst, and heat treating the preactived catalyst.

A proposed mechanism for the method of the present invention is generally as follows:
1. $MRR' + 2R"OH \rightarrow M(OR")_2$;
2. $M(OR")_2 + ClAR'''_x \rightarrow$ "A";
3. "A" + $TiCl_4/Ti(OR"")_4 \rightarrow$ "B";
4. "B" + $TiCl_4 \rightarrow$ "C" (catalyst component);
5. "C" + TEAl → preactivated catalyst; and
6. Heat treatment of the preactivated catalyst.

In the above formulas, M may be any suitable metal, preferably a Group IIA, most preferably Mg. In the above formulas, R, R', R", R''', and R"" are each independently hydrocarbyl or substituted hydrocarbyl moieties, with R and R' having from 1 to 20 carbon atoms, preferably from 1 to 10 carbon atoms, more preferably from 2 to 6 carbon atoms, and even more preferably, from 2 to 4 carbon atoms. R" generally comprises from 3 to 20 carbon atoms, R''' generally comprises from 2–6 carbon atoms, and R"" generally comprises from 2–6 carbon atoms and is generally butyl. Any combination of two or more of R, R', R", R''', and R"" may be the same, or the R groups may be different.

In the above formula $ClQR'''_x$, Q is preferably a nonreducing oxyphilic group which is capable of exchanging one chloride of an alkoxide, R''' is preferably an alkyl, and x is the valence of Q minus 1. Examples of Q include titanium, silicon, aluminum, carbon, tin and germanium, most preferred of which is titanium, wherein x is 3. Examples of R''' include methyl, ethyl, propyl, isopropyl and the like having 2–6 carbon atoms.

While the exact composition of product "A" is unknown, it is believed that it contains a partially chlorinated metal compound, one example of which may be ClMg(OR"). The first halogenation/titanation step produces product "B" which is probably a complex of chlorinated and partially chlorinated metal and titanium compounds and for example, may possibly be represented by $(MCl_2)_y\cdot (TiCl_x(OR)_{4-x})_{z'}$. The second chlorination/titanation produces product "C" which is also probably a complex of chlorinated and partially chlorinated metal and titanium compounds but different from product "B" and may possibly be represented by $(MCl_2)_y\cdot (TiCl_x(OR)_{4-x})_{z'}$. It is expected that the level of chlorination of "product C" would be greater than that of product "B". This greater level of chlorination would produce a different complex of different compounds. While this description of the reaction products offers the most probable explanation of the chemistry at this time, the invention as described in the claims is not limited by this theoretical mechanism.

Metal dialkyls and resultant metal dialkoxides suitable for use in the present invention include any that when utilized in the present invention will yield a suitable polyolefin catalyst. Preferred metal dialkoxides and dialkyls include Group IIA metal dialkoxides and dialkyls. More preferably the metal dialkoxide or dialkyl is a magnesium dialkoxide or dialkyl.

In the practice of the present invention, the magnesium dialkyl [MgRR'] may be any magnesium dialkyl where R and R' are as described above. Of course, R and R' may be the same or different. Non-limiting examples of suitable magnesium dialkyls include diethyl magnesium, dipropyl magnesium, dibutyl magnesium, butylethylmagnesium, etc. Butylethylmagnesium (BEM) is the preferred magnesium dialkyl.

In the practice of the present invention, the metal dialkoxide is preferably a magnesium compound of the general formula $Mg(OR")_2$, where R" is a hydrocarbyl or substituted hydrocarbyl of 1 to 20 carbon atoms. The magnesium dialkoxide compound is a reaction product of a reaction of a magnesium compound of the general formula MgRR', wherein R and R' are alkyl groups of 1–10 carbon atoms and may be the same or different, and an alcohol of the general formula R"OH wherein the alcohol is linear or branched and wherein R" is an alkyl group of 4–20 carbon atoms.

The metal dialkoxide is most preferably soluble and non-reducing. A non-reducing compound has the advantage of forming $MgCl_2$ instead of insoluble $Ti^{+3}$ species formed by reduction of compounds such as MgRR' which tend to form catalysts having a broad particle size distribution. In addition, $Mg(OR")_2$ is less reactive than MgRR' and the chlorination with a mild chlorinating agent, followed by a simultaneous chlorination/titanation with a mild reagent and a second chlorination/titanation with a stronger reagent are gradual and successively stronger reactions which may result in more uniform product, i.e., larger catalyst particles and a more uniform catalyst particle size distribution.

Non-limiting examples of preferred species of metal dialkoxides which are useful include magnesium butoxide, magnesium pentoxide, magnesium hexoxodie, magnesium di(2-ethylhexoxide), and any alkoxide suitable for making the system soluble. The most preferred metal alkoxide species is magnesium di(2-ethylhexoxide).

As a non-limiting example, a magnesium dialkoxide, such as magnesium di(2-ethylhexoxide), may be produced by reacting an alkyl magnesium compound (MgRR'), such as butyl ethyl magnesium (BEM), with an alcohol (ROH), such as 2-ethylhexanol, illustrated by the following formula:

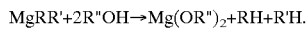

MgRR'+2R"OH→Mg(OR")₂+RH+R'H.

In the case of BEM, RH and R'H are butane and ethane, respectively. The reaction takes place at room temperature and the reactants form a solution. Any two or more of the R groups may be the same, or the R groups may all be different from one another.

In the practice of the present invention, any alcohol yielding the desired metal dialkoxide may be utilized. As a non-limiting example, the alcohol may be any alcohol of the general formula R"OH where R" is an alkyl group of 4–20 carbon atoms. The alcohol may be linear or branched. Non-limiting examples of the alcohol include butanol, isobutanol, 2-ethylhexanol, etc. The preferred alcohol is 2-ethylhexanol.

Generally the amount of alcohol added will be in the range of about 0.5 equivalents to about 4 equivalents (equivalents are relative to the magnesium or metal compound throughout), preferably in the range of about 1 to about 3 equivalents. While it is believed that almost any alcohol may be utilized, it is preferred that a higher order branched alcohol, for example, 2-ethyl-1-hexanol, be utilized. Generally, the alcohol utilized will have at least 3, preferably at least 4, more preferably at least 5, and most preferably at least 6 carbon atoms.

Alkyl metal compounds are highly associative due to electron-deficient bonding which results in a high molecular weight species which is very viscous in solution. This high viscosity may be reduced by the addition of an aluminum alkyl, such as triethylaluminum, which disrupts the association between the individual alkyl metal molecules. The preferred ratio of alkyl aluminum to metal is 0.001:1 to 1:1, more preferably 0.01 to 0.1:1 and most preferably 0.03:1 to 0.05: 1. In addition, an electron donor such as an ether, e.g. diisoamyl ether (DIAE) may be used to further reduce the viscosity of the alkyl metal. The preferred ratio of electron donor to metal is in the range of about 0:1 to about 10:1 and more preferably is in the range of about 0.1:1 to about 1:1.

Agents useful in the halogenating step for halogenating the metal alkoxide include any halogenating agent which when utilized in the present invention will yield a suitable polyolefin catalyst. Preferably the halogenating step is a chlorinating step and the preferred halogenating agent is a chloride.

The preferred chloride halogenating agent ("chlorinating agent") is preferably a monochloride compound which only partially chlorinates the magnesium alkoxide. The preferred chlorinating agent is of the general formula $ClQR'''_x$ or $ClQOR'''_x$, where Q is a nonreducing oxyphilic group which is capable of exchanging one chloride for an alkoxide, R''' is alkyl and x is the valence of Q minus 1. Examples of Q are titanium, silicon, aluminum, carbon, tin and germanium, most preferred of which is titanium and silicon wherein x is 3. Examples of R''' are methyl, ethyl, propyl, isopropyl and the like having 2–6 carbon atoms. Examples of a chlorinating agent effective in the present invention are $ClTi(O^iPr)_3$ and $ClSi(Me)_3$.

The halogenating of the metal alkoxide compound is generally conducted in a hydrocarbon solvent under an inert atmosphere. Non-limiting examples of suitable solvents include toluene, heptane, hexane, octane and the like. The preferred solvent is hexane.

In this halogenating step, the mole ratio of metal alkoxide to halogenating agent is generally in the range of about 6:1 to about 1:3, preferably in the range of about 3:1 to about 1:2, more preferably in the range of about 2:1 to about 1:2, and even most preferably in the range of about 1:1.

The halogenating step is generally carried out at a temperature in the range of about 0° C. to about 100° C., and for a reaction time in the range of about 0.5 to about 24 hours. Preferably, the halogenating step is carried out at a temperature in the range of about 20° C. to about 90° C., and for a reaction time in the range of about 1 hour to about 4 hours.

Once the halogenating step is carried out and the metal dialkoxide is halogenated, product "A" is subjected to one or more halogenation/titanation treatments.

In the one or more halogenating/titanating steps, the halogenating/titanating agent is preferably a tetrasubstituted titanium compound with all four substituents being the same and the substituents being a halide or an alkoxide or phenoxide with 2 to 10 carbon atoms, such as $TiCl_4$ or $Ti(OR)_4$. The halogenating/titanation agent is preferably a chlorination/titanation agent.

The preferred chlorinating/titanating agent may be a single compound or a combination of compounds. The method of the present invention provides an active catalyst after the first chlorination/titanation step; however, chlorination/titanation is preferably carried out at least twice using a different compound or combination of compounds at each of the steps, and involves use of a stronger chlorination/titanation with each successive chlorination/titanation step.

The first chlorination/titanation agent is preferably a mild titanation agent, such as, for example a blend of a titanium halide and a organic titanate. More preferably, the first chlorinating/titanating agent is a blend of $TiCl_4$ and $Ti(OBu)_4$ in a range from about 0.5:1 to 6:1 $TiCl_4/TiOBu)_4$, most preferably in a range from about 2:1 to 3:1. It is believed that the blend of titanium halide and organic titanate react to form a titanium alkoxyhalide, $Ti(OR)_aX_b$, where OR and X are an alkoxide and halide, respectively, a+b is the valence of titanium which is typically 4 and both a and b may be fractional, e.g. a=2.5 and b=1.5.

In the alternative, the first chlorination/titanation agent may be a single compound. Examples of the first chlorination/titanation agent as a single compound are $Ti(OC_2H_5)_3Cl$, $Ti(OC_3H_7)_2Cl_2$, $Ti(OC_3H_7)_3Cl$, $Ti(OC_4H_9)Cl_3$, $Ti(OC_6H_{13})_2Cl_2$, $Ti(OC_2H_5)_2Br_2$, and $Ti(OC_{12}H_{25})Cl_3$.

The first halogenation/titanation step is generally carried out in a hydrocarbon solvent. Nonlimiting examples of suitable hydrocarbon solvents include heptane, hexane, toluene, octane and the like. The preferred solvent is hexane.

A solid product "B" is precipitated at room temperature following the addition of a first halogenation/titanium agent to the soluble product "A".

The amount of halogenation/titanium agent utilized must be sufficient to precipitate a solid product from the solution. In general, the amount of halogenation/titanium agent utilized, based on the ratio of titanium to metal, will generally be in the range of about 0.5 to about 5, preferably in the range of about 1 to about 4, and most preferably in the range about 1.5 to about 2.5.

The solid product "B" precipitated in this first titanation step is then recovered by any suitable recovery technique, and washed with a hydrocarbon solvent.

Compounds suitable for use as the second halogenation/titanation agent include those suitable for use as the first halogenation/titanation agent, except that preferably, the second agent is a stronger agent. The second stronger halogenating/titanating agent is preferably a titanium halide, more preferably titanium tetrachloride [$TiCl_4$].

The second halogenation/titanation step is generally carried out by slurrying the solid product "B" in a hydrocarbon solvent to produce reaction product, or catalyst component, "C". Hydrocarbon solvents listed as suitable for the first halogenation/titanation step may be utilized. In general, the amount of titanium tetrachloride utilized will generally be in the range of about 0.1 to about 5 equivalents, preferably in the range of about 0.15 to about 4 equivalents, most preferably in the range of about 0.175 to about 2.5.

The catalyst component "C" may be combined with an organoaluminum cocatalyst component (a "preactivating agent") to form a preactivated catalyst suitable for the polymerization of olefins. Typically, the cocatalysts which are used together with the transition metal containing catalyst component "C" are organometallic compounds of Group Ia, IIa, and IIIa metals such as aluminum alkyls, aluminum alkyl hydrides, lithium aluminum alkyls, zinc alkyls, magnesium alkyls and the like.

The preactivating agent is preferably an organoaluminum compound. The organoaluminum preactivating agent is preferably an aluminum alkyl of the formula $AlR^{\hat{}}_3$ where $R^{\hat{}}$ is an alkyl having 1–8 carbon atoms or a halide, R' being the same or different and at least one R is an alkyl. The organoaluminum preactivating agent is more preferably a trialkyl aluminum, such as trimethyl aluminum (TMA), triethyl aluminum (TEAl) and triisobutyl aluminum (TiBAl). The most preferred preactivating agent is TEAl. The ratio of Al to titanium is in the range from 0.01:1 to 2:1 and preferably is 0.25:1 to 1.2:1.

The preactivated catalyst is then subjected to heat treating with a temperature in the range of about 90° C. to about 150° C., preferably to a temperature in the range of about 100° C. to about 125° C. The slurry is held at this elevated temperature for a holding period in the range of about 0.5 hours to about 24 hours, preferably for a holding period in the range of about 1 hour to about 4 hours. Subsequently, the final solid catalyst is recovered and washed with a hydrocarbon solvent.

Optionally, an electron donor may be added with the halogenation agent, the first mild halogenation/titanation agent, or the second stronger halogenation/titanation agent. Most preferably, an electron donor is utilized in the second halogenation/titanation step.

Electron donors for use in the preparation of polyolefin catalysts are well known, and any suitable electron donor may be utilized in the present invention which will provide a suitable catalyst.

Electron donors, also known as Lewis bases, are organic compounds of oxygen, nitrogen, phosphorous, or sulfur which can donate an electron pair to the catalyst.

The electron donor may be a monofunctional or polyfunctional compound, advantageously selected from among the aliphatic or aromatic carboxylic acids and their alkyl esters, the aliphatic or cyclic ethers, ketones, vinyl esters, acryl derivatives, particularly alkyl acrylates or methacrylates and silanes. A preferred example of a suitable electron donor is di-n-butyl phthalate. A more preferred example of a suitable electron donor is an alkylsilylalkoxide of the general formula $RSi(OR')_3$, e.g., methylsilyltriethoxide [$MeSi(OEt_3)$], where R and R' are alkyls with 1–5 carbon atoms and may be the same or different.

The support of the catalyst system of the present invention should be an inert solid which is chemically unreactive with any of the components of the conventional Ziegler-Natta catalyst. The support is preferably a magnesium compound. Examples of the magnesium compounds which are to be used to provide a support for the catalyst component are magnesium halides, dialkoxymagnesiums, alkoxymagnesium halides and carboxylates of magnesium. The preferred magnesium compound is a magnesium chloride ($MgCl_2$).

Optionally, the Ziegler-Natta catalyst may be prepolymerized. Generally, a prepolymerization process is effected by contacting a small amount of monomer with the catalyst after the catalyst has been contacted with the co-catalyst. A pre-polymerization process is described in U.S. Pat. Nos. 5,106,804; 5,153,158; and 5,594,071, hereby incorporated by reference.

The catalyst may be used in any known process for the homopolymerization or copolymerization of any type of α-olefins. For example, the present catalyst is useful for catalyzing ethylene, propylene, butylene, pentene, hexene, 4-methylpentene and other α-alkenes having at least 2 carbon atoms, and also for mixtures thereof. Preferably, the catalysts of the present invention are utilized for the polymerization of ethylene to produce polyethylene.

The resulting catalyst of the present invention has very high activity which is at least partially dependent upon the olefin polymerization conditions. Generally, the activity of the catalyst is at least 6,000 gPE/g catalyst, but may also be greater than 100,000 gPE/g catalyst.

Additionally, the resulting catalyst of the present invention provides a polymer with excellent fluff morphology.

Thus, the catalyst of the present invention provides for large polymer particles with a uniform distribution of sizes, wherein small, extremely fine particles (less than about 125 microns) are only present in low concentrations. The catalysts of the present invention, which include large, readily transferred powders with high powder bulk densities, are amenable to polymerization production processes.

The polymerization process may be bulk, slurry or gas phase. It is preferred to use the catalyst of the present invention in a slurry phase polymerization. The polymerization conditions (e.g., temperature and pressure) are dependent upon the type of equipment utilized, as well as the type of polymerization process utilized, and are known in the art. For example, the temperature may be in the range of about 50–200° C., and the pressure may be in a range of about 10–800 psi.

The olefin monomer may be introduced into the polymerization reaction zone in a diluent which is a nonreactive heat transfer agent which is liquid at the reaction conditions. Examples of such a diluent are hexane and isobutane. For the copolymerization of ethylene with another alpha-olefin, such as, for example, butene or hexene, the second alpha-olefin may be present at 0.01–20 mole percent, preferably 0.02–10 mole percent.

For the polymerization process, it may be preferred to include an internal electron donor in the synthesis of the catalyst and an external electron donor or stereoselectivity control agent (SCA) to activate the catalyst at polymerization. An internal electron donor may be used in the formation reaction of the catalyst during the chlorination or chlorination/titanation steps. Compounds suitable as internal electron-donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$ where R is selected from the group consisting of an alkyl group, a cycloalkyl group, an aryl group and a vinyl group; R' is an alkyl group; and m is 0–3, wherein R may be identical with R'; when m is 0, 1 or 2, the R' groups may be identical or different; and when m is 2 or 3, the R groups may be identical or different.

Preferably, the external donor of the present invention is selected from a silane compound of the following formula:

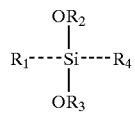

wherein R1 and R4 are both an alkyl or cycloalkyl group containing a primary, secondary or tertiary carbon atom attached to the silicon, R1 and R4 being the same or different; R2 and R3 are alkyl or aryl groups. R1 may be methyl, isopropyl, cyclopentyl, cyclohexyl or t-butyl; R2 and R3 may be methyl, ethyl, propyl, or butyl groups and not necessarily the same; and R4 may also methyl, isopropyl, cyclopentyl, cyclohexyl or t-butyl. Specific external donors are cyclohexylmethydimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

Polyethylene produced using the above described catalyst will have an MWD (MW/MD) of at least 4.0, preferably at least 5.0, more preferably at least 6.0, and even more preferably at least 7.0.

EXAMPLES

The invention having been generally described, the following examples are provided merely to illustrate certain embodiments of the invention. It is understood that the examples are given by way of illustration and are not intended to limit the specification or the claims to follow in any manner.

Catalyst Preparation

This example provides an illustration of a controlled-morphology polyethylene catalyst that allows for fine tuning of the intrinsic molecular weight distribution (MWD) of the polymer given by the catalyst. Control of the MWD allows a variety of polymer grades—with applications ranging from injection molding (narrow MWD) to blown films (broad MWD)—to be produced with a single catalyst system.

The catalyst was made as follows:

Step 1.

BuEtMg/DIAE/TEAI (1:0.6:0.03)+2-Ethylhexanol (2.09) to provide soluble intermediate A.

Step 2.

Intermediate+1.0 ClTi(OPr)$_3$ to provide soluble intermediate B.

Step 3.

Intermediate B+Ti(OBu)4/TiCl4 (2.0:1.0) to provide solid precatalyst.

Step 4.

Precatalyst+TiCl4 (0.25)+TEAI provide the final catalyst.

Step 5.

The final catalyst was then subjected to heating at 90° C. for times as shown in Table 1 below.

Polymerization

The reactor (autoclave Engineer) used for the polymerization of ethylene has a four liter capacity and is fitted with four mixing baffles with two opposed pitch mixing propellers. Ethylene and hydrogen are introduced to the reactor vessel via Teledyne-Hastings Raydist mass flow controllers while a dome loaded back-pressure regulator keeps the internal reaction pressure constant. The reaction temperature is maintained (in the reactor jacket) by steam and cold water using a Kammer Valve linked to a Barber-Coleman Controller. Hexane was used as diluent.

Experimental variables:

| | |
|---|---|
| Temperature | 80° C. |
| Reaction time | 60 min |
| Pressure | 125 psi |
| Catalyst | 0.2 cc slurry (ca. 10 mg catalyst) |
| Cocalyst | TEAL @ 0.25 mmole/L |
| Flow rates | H$_2$/C$_2$ @ 0.25 |

TABLE 1

| Time (h, 90 °C.) | cocat | SR5 | $M_w/M_n$ |
|---|---|---|---|
| 0 (control) | TEAl | 10.4 | 5.4 |
| 2 | TEAl | 11.1 | 6.7 |
| 4 | TEAl | 11.7 | 6.8 |
| 6 | TEAl | 12.5 | 6.4 |
| 24 | TEAl | 12.8 | 6.8 |

The catalyst solution was sampled at 2, 4, 6, and 24 hours. Heat treatment at this stage significantly broadens the intrinsic MWD of the as shown by the SR5 and GPC data presented in Table 1 and FIG. 1 (TEAI cocatalyst). Here it can be seen that the MWD increases steadily through the first six hours of heating. After this point, the broadening levels out. Moreover, the data indicates that the molecular weight distribution of the catalyst can potentially be fine-tuned to a desired value based on the polymer application. Finally, no loss in the high activity or excellent fluff morphology given by this catalyst was seen upon heat treatment.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A polyethylene polymer produced by a process comprising:
    contacting ethylene and optionally one or more α-olefin monomers together, in the presence of a catalyst under polymerization conditions,
    wherein the catalyst was produced by:
        i) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms;
        ii) contacting the reaction product A with a first halogenating/titanating agent to form a reaction product B;
        iii) contacting the reaction product B with a second stronger halogenating/titanating agent to form a reaction product C;
        iv) contacting the reaction product C with an organoaluminum preactivating agent to form a preactivated catalyst; and
        v) heating the preactivated catalyst at a temperature in the range of about 90° C. to about 150° C., for a time in the range of about thirty minutes to about a twenty-four hours.

2. The polymer of claim 1 wherein the polyethylene polymer is a homopolymer of ethylene.

3. The polymer of claim 2 wherein the polyethylene polymer has a molecular weight distribution of greater than about 4.0.

4. The polymer of claim 2 wherein the organoaluminum preactivating agent comprises an aluminum alkyl, and wherein the ratio of alkyl aluminum to magnesium is 0.001:1 to 1:1.

5. The polymer of claim 2 wherein any one of steps i)–iv) further comprises an electron donor, and wherein the ratio of electron donor to magnesium is in the range of about 0:1 to about 10:1.

6. The polymer of claim 5 wherein the electron donor is an ether.

7. The polymer of claim 1 wherein the polymerization is in bulk, slurry or gas phase.

8. The polymer of claim 1 wherein the soluble magnesium dialkoxide compound is a reaction product of a reaction comprising an alkyl magnesium compound of the general formula MgRR', wherein R and R' are alkyl groups of 1–10 carbon atoms and may be the same or different, and an alcohol of the general formula R"OH wherein the alcohol is linear or branched and wherein R" is an alkyl group of 4–20 carbon atoms.

9. The polymer of claim 8, wherein the alkyl magnesium compound is selected from the group consisting of diethyl magnesium, dipropyl magnesium, dibutyl magnesium and butylethylmagnesium, and wherein the alcohol is selected from the group consisting of ethanol, propanol, isopropanol, butanol, isobutanol and 2-ethylhexanol.

10. The polymer of claim 1 wherein the soluble magnesium dialkoxide compound is a magnesium di(2-ethylhexoxide).

11. The polymer of claim 1 wherein the halogenating agent is of the general formula ClQR'"$_x$, wherein Q is a nonreducing oxyphilic group, R'"$_x$ is a hydrocarbyl moiety having from about 2 to 6 carbon atoms, and x is the valence of Q minus 1.

12. The polymer of claim 1 wherein the first chlorinating/titanating agent is a blend of TiCl$_4$ and Ti(OBu)$_4$ in a range from 0.5:1 to 6:1 TiCl$_4$/Ti(OBu)$_4$.

13. The polymer of claim 1 wherein the first chlorinating/titanating agent is Ti(OC$_2$H$_5$)$_3$Cl, Ti(OC$_3$H$_7$)$_2$Cl$_2$, Ti(OC$_3$H$_7$)$_3$Cl, Ti(OC$_4$H$_9$)Cl$_3$, Ti(OC$_6$H$_{13}$)$_2$Cl$_2$, Ti(OC$_2$H$_5$)$_2$Br$_2$, or Ti(OC$_{12}$H$_{25}$)Cl$_3$.

14. The polymer of claim 1 wherein the second stronger chlorinating/titanating agent is titanium tetrachloride.

15. The polymer of claim 1 wherein the organoaluminum preactivating agent is an aluminum alkyl of the formula AlR^$_3$ where R^ is an alkyl having 1–8 carbon atoms or a halide, R^ being the same or different and at least one R^ is an alkyl and wherein the ratio of Al to titanium is in the range from 0.1:1 to 2:1.

16. A process for α-olefin polymerization, comprising contacting ethylene and optionally one or more α-olefin monomers together in the presence of a catalyst under polymerization conditions,
    wherein the catalyst was produced by:
        i) contacting a soluble magnesium dialkoxide compound of the general formula Mg(OR")$_2$ with a halogenating agent capable of exchanging one halogen for one alkoxide to form a reaction product A, where R" is a hydrocarbyl or substituted hydrocarbyl having from 1 to 20 carbon atoms;
        ii) contacting the reaction product A with a first halogenating/titanating agent to form a reaction product B;
        iii) contacting the reaction product B with a second stronger halogenating/titanating agent to form a reaction product C;
        iv) contacting the reaction product C with an organoaluminum preactivating agent to form a preactivated catalyst; and
        v) heating the preactivated catalyst at a temperature in the range of about 90° C. to about 150° C. for a time in the range of about thirty minutes to about twenty-four hours.

17. The process of claim 16 further comprising:

vi) extracting polyolefin polymer.

18. The process of claim 16 wherein the polethylene polymer is a homopolymer of ethylene.

19. The process of claim 18 wherein the polyethylene polymer has a molecular weight distribution of at least about 4.0.

20. The process of claim 16 wherein the polymerization is in bulk, slurry or gas phase.

21. The process of claim 16 wherein the halogenating agent is of the general formula $ClQR'''_x$, wherein Q is a nonreducing oxyphilic group, and $R'''_x$ is a hydrocarbyl moiety having from about 2 to 6 carbon atoms.

22. The process of claim 21 wherein the halogenating agent is $ClTi(OiPr)_3$.

23. The process of claim 16 wherein the first halogenating/titanating agent is a blend of two tetresubstituted titanium compounds having the general formula $TiCl_4/Ti(OR'''')_4$, wherein $R''''_4$ is a hydrocarbyl moiety having 2 to 6 carbon atoms.

24. The process of claim 23 wherein the first halogenating/titanating agent is a blend of $TiCl_4/Ti(OBu)_4$, and wherein the ratio of $TiCl_4$ to $Ti(OBu)_4$ is in the range of about 0.5:1 to about 6:1.

25. The process of claim 24 wherein the molar ratio of titanium to magnesium present in step (ii) is between about 0.5:1 and about 5.0:1.

26. The polymer of claim 16 wherein the first chlorinating/titanating agent is $Ti(OC_2H_5)_3Cl$, $Ti(OC_3H_7)_2Cl_2$, $Ti(OC_3H_7)_3Cl$, $Ti(OC_4H_9)Cl_3$, $Ti(OC_6H_{13})_2Cl_2$, $Ti(OC_2H_5)_2Br_2$, or $Ti(OC_{12}H_{25})Cl_3$.

27. The process of claim 16 wherein the second stronger halogenating/titanating agent is $TiCl_4$.

28. The process of claim 27 wherein $TiCl_4$ is present in the range of about 0.1 to about 5.0 equivalents to magnesium.

29. The process of claim 16 wherein the organoaluminum preactivating agent is TEAl.

30. The process of claim 16 wherein an electron donor is present in any one of steps i–iv, and wherein the ratio of electron donor to magnesium is in the range of about 0:1 to about 10:1.

* * * * *